No. 610,965. Patented Sept. 20, 1898.
C. H. GREENWELL.
COMBINATION HORSESHOE.
(Application filed Jan. 27, 1898.)

(No Model.) 2 Sheets—Sheet 1.

Witnesses:
Wm C Thompson
B. E. Doll

Inventor:
Charles H. Greenwell.
By E. T. Silvius.
Attorney.

No. 610,965. Patented Sept. 20, 1898.
C. H. GREENWELL.
COMBINATION HORSESHOE.
(Application filed Jan. 27, 1898.)

(No Model.) 2 Sheets—Sheet 2.

Witnesses:
Wm L Thompson
B. E. Doll

Inventor:
Charles H. Greenwell.
By E. T. Silvius,
Attorney.

THE NORRIS PETERS CO., PHOTO-LITHO., WASHINGTON, D. C.

UNITED STATES PATENT OFFICE.

CHARLES H. GREENWELL, OF INDIANAPOLIS, INDIANA.

COMBINATION-HORSESHOE.

SPECIFICATION forming part of Letters Patent No. 610,965, dated September 20, 1898.

Application filed January 27, 1898. Serial No. 668,155. (No model.)

*To all whom it may concern:*

Be it known that I, CHARLES H. GREENWELL, a citizen of the United States, residing at Indianapolis, in the county of Marion and State of Indiana, have invented certain new and useful Improvements in Combination-Horseshoes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to metallic shoes for horses, mules, or oxen, which are used for the purpose of protecting the animal and its hoof; and it consists in what may be termed a "combined smooth and rough shoe," and comprising two principal elements—a smooth and permanently-attached shoe and a rough shoe provided with renewable spikes and detachably connected to the smooth shoe, being adapted to be adjusted to the varying conditions of service; and it consists, further, in the parts and combination of parts thereof, as will be more fully described hereinafter.

My object is to provide an improved shoe adapted for winter use to enable an animal to walk safely upon ice and which may be readily changed from a rough to a smooth shoe, or vice versa, by any one without waiting for a professional horseshoer or jeopardizing the animal by forcing it to walk in smooth shoes upon ice to a shop.

A further object is to provide such a shoe in which the spikes for use upon ice may be quickly renewed by an unprofessional when they have become blunt or smooth from wear.

I attain these objects in my invention, which is, furthermore, cheaply manufactured and is durable and economical in use.

Figure 1:
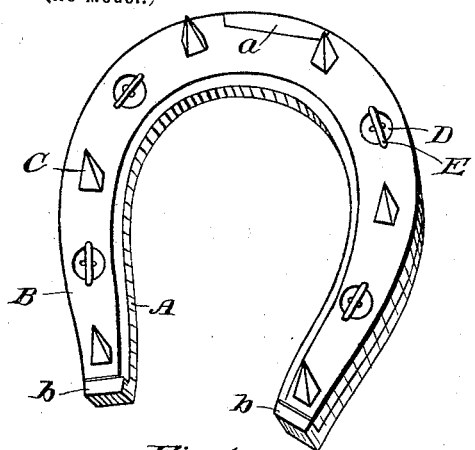
Figure 2:
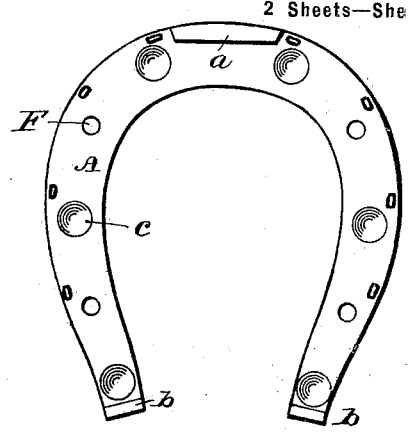
Figure 3:
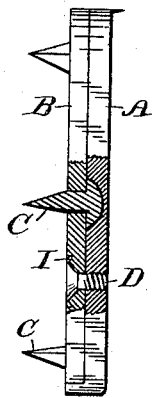
Figure 4:
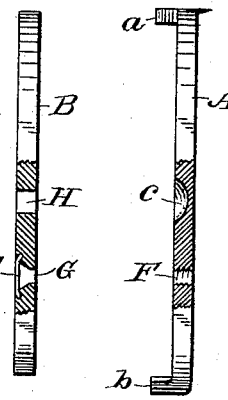
Figure 5:
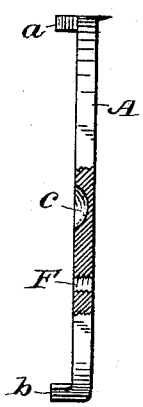
Figure 6:
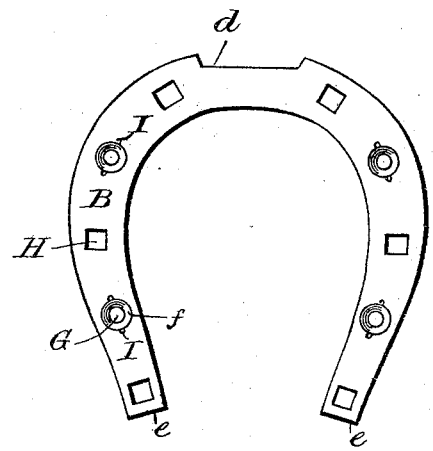
Figure 7:
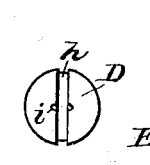
Figure 8:
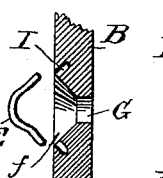
Figure 9:
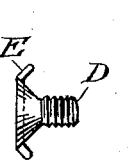
Figure 10:
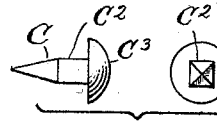
Figure 11:
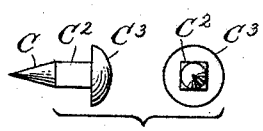
Figure 12:
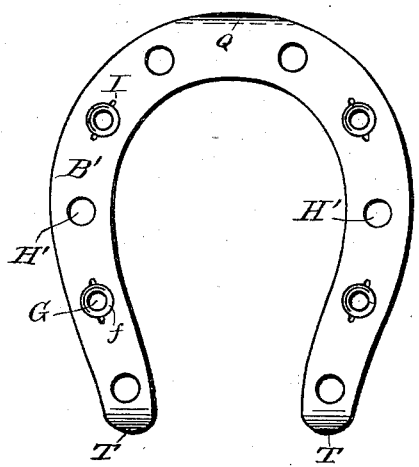
Figure 13:
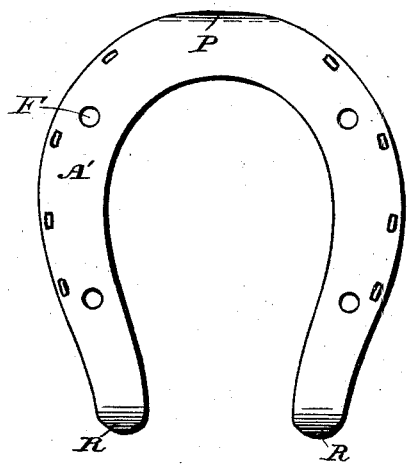
Figure 14:
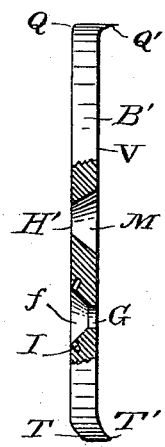
Figure 15:
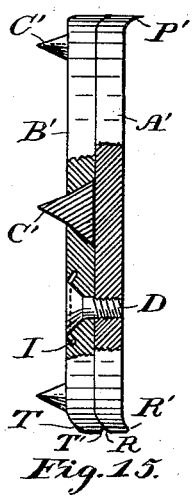
Figure 16:
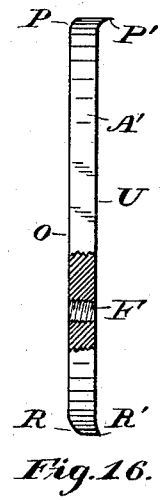
Figure 17:
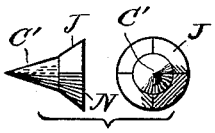
Figure 18:
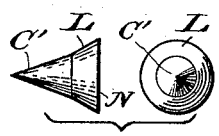

Referring to the drawings, Figure 1 represents a perspective view of my shoe complete; Fig. 2, a front plan of an upper or shoe proper having a toe and heels; Figs. 3, 4, and 5, side views showing details in fragmentary sectional views; Fig. 6, a front plan of a detachable shoe or sole; Figs. 7, 8, 9, 10, and 11, views of parts in detail; Fig. 12, a front plan of a shoe or sole adapted to a shoe proper having no toe or heels; Fig. 13, a front plan of a shoe proper having no toe or heels; Figs. 14, 15, and 16, side views showing details in fragmentary sectional views; and Figs. 17 and 18 detail views of spikes.

In the drawings, A A′ designate the shoe; B B′, the sole; C C′, the spikes; D, the connecting-bolt, and E the bolt-lock.

In constructing my invention I provide a shoe of suitable form and material adapted to be nailed to the hoof in the usual manner and a sole adapted to fit to the shoe whether the latter has a toe and heels or has not. I also provide spikes of various shapes, as may be preferred, and the shoe and sole are adapted to them, the principal feature in the spikes being that they are adapted to be easily removed with trifling expense.

The complete device shown in Fig. 1 comprises the shoe A, having a toe $a$ and heels $b\ b$, and it may have suitable nail-holes for attaching to the hoof, or it may be attached by any other suitable means. It has holes F, having screw-threads, adapted to receive the connecting-bolts D, by which the sole is secured thereto. When a spike having a semicircular head is used, the shoe has also in its front semicircular sockets $c$, registering with the heads of the spikes and adapted to receive the heads. The sole B has a recess $d$, adapted to fit against the toe $a$, and the ends $e\ e$ fit against the heels $b\ b$, so that the sole is thereby so locked to the shoe that end and side slipping is prevented. The holes G to receive the bolts D are preferably countersunk at the front of the sole, as $f$, but may be omitted if a bolt having a "round" head is used. At two opposite sides of the hole G are small angular holes I, registering with the slot $h$ in the top of the head of the bolt. To prevent the bolt from accidentally coming out, I provide the bolt-lock E, composed of a short section of suitable metallic wire, the ends of which are driven into the holes I and the middle portion beaten down into the slot $h$, and at each or one side of this slot is a small angular groove $i$, into which a bodkin or nail-point may be inserted to raise the lock E when it is to be removed. The spike C may have either a circular body and point or one that is square or other form in cross-section, and the shank $C^2$ is preferably rectangular and adapted to the hole H, but the latter may be of circular form should a circular shank be desired. The head C³ is preferably circular and having a semicircular top, this form being adapted particularly when a sole is desired of minimum thickness to secure lightness.

The shoe A' is sometimes desired in which the toe and heels are dispensed with, and the forward end P is turned up to form a lip P' at the top or back U, and the rear ends R R have a slight lip R'. The front O may have the sockets c if the round-headed spike described is used, or they may be omitted, as shown. The sole B' at the forward end Q is also turned up to form a lip Q', adapted to fit over the rounded end P of the shoe, and the rear ends T T have a slight lip T', adapted to fit over the rounded ends R R of the shoe. These lips relieve the connecting-bolts from excessive strains endwise of the shoe, as the back V of the sole rests against the front O of the shoe. Circular holes H' to receive the spikes C' are provided and have a tapering portion M, adapted to the form of the under side of the head of the spike C', which may have facets J or may be circular, as L, the top N being also circular. The form of spike shown in Fig. 18 may be used to advantage in the sole A, in which case the holes are suitably adapted for it. The comparatively large and flat top N of the head provides the maximum wearing-surface against the face O of the shoe.

By the use of my combination-shoe one may keep a supply of spikes ready for use, which may be quickly inserted by the use of simple means, as a screw-driver, and the sole and spikes, or the latter only, may be quickly removed before stabling the animal for the night to prevent it being injured, as frequently happens when rough-shod in the ordinary manner.

The shoe, the spikes, and the connecting-bolts are preferably made of steel, as well as the sole; but the latter may suitably be made of malleable iron, or other suitable metal may be substituted.

Having thus described my invention, what I claim as new, and desire to secure by Letters Patent, is—

1. An ice-shoe comprising the upper or shoe proper having the screw-threaded holes, the sole or detachable member having the bolt-holes registering with said threaded holes, the retaining-bolts in said holes and having slotted heads, the bolt-locks consisting each of metallic wire inserted in the slot of the screw-head and also inserted at each end thereof into an angular hole in said detachable member adjacent to said bolt-head, and the removable spikes each having a head interposed between said shoe proper and said sole and in a suitable recess, substantially as shown and described.

2. In a horseshoe, the combination of the upper or shoe proper having the screw-threaded holes, the sole or auxiliary shoe having the bolt-holes registering with said threaded holes and extending as an integrally-formed member from the toe to both heels of said upper shoe and interlocking with said toe and said heels, retaining-bolts in said holes, bolt-locks to prevent said bolts from turning in said holes, and the removable spikes each inserted in a suitable hole in said sole and having a head interposed between said upper shoe and said sole and in a suitable recess, substantially as shown and described.

3. In a horseshoe, the combination of the upper or shoe proper adapted to be secured to the hoof and having the toe and heel calks, the screw-threaded holes therein, the detachable sole or part adapted to extend between said toe and heel calks and having the recess engaging said toe-calk at its back and both ends and also having the bolt-holes registering with said screw-threaded holes, the connecting-bolts in said holes, the spike-holes in said sole having enlarged tapering or countersunk inner ends, the spikes in said holes and having broad heads to provide enlarged bearing-surface against said upper shoe, said spikes being inserted in said tapering holes, substantially as shown and described.

4. In a horseshoe, the combination of the shoe proper having the detachable sole, the spikes inserted in suitable holes in said sole and entering from the back thereof, said spikes being provided each with a head interposed between said shoe and said sole and retained in a suitable recess therein, the threaded connecting-bolts inserted in suitable holes, the slot in the top of each of said bolts, the bolt-lock in said slots and the holes in the front of said sole into which the ends of said lock are forced and secured, substantially as shown and described.

5. In a horseshoe, the combination of the shoe proper having the screw-threaded vertical bolt-holes, the sole or detachable part formed as a continuous member to conform to the contour of said shoe proper and interlocking therewith at the toe and heels thereof, bolt-holes in said sole registering with said screw-threaded holes, the spike-holes in said sole, removable spikes in said spike-holes, and retaining-bolts in said bolt-holes, substantially as shown and described.

6. In a horseshoe, the combination of the upper or shoe proper having the screw-threaded holes, the sole or auxiliary shoe having bolt-holes registering with said threaded holes and provided with two angular holes disposed at opposite sides of each of said bolt-holes and extending from the outer face of said sole, the retaining-bolts in said bolt-holes and having each a slotted head, the ductile wire in the slot of said head and having ends inserted in said angular holes whereby said bolt is locked to said sole, and the removable spikes retained by said sole, substantially as shown and described.

7. In a horseshoe, the combination of the upper or shoe proper provided with a series of nail-holes and provided also with a series of screw-threaded bolt-holes, the sole or auxiliary shoe having a series of bolt-holes registering with said screw-threaded holes and extending as a continuously-formed member from the toe to both heels of said shoe proper and interlocking with said toe and said heels, a series of spike-holes in said sole and removable spikes in said spike-holes, and retaining-bolts in said bolt-holes whereby said sole is detachably secured to said shoe proper, substantially as shown and described.

8. In a horseshoe, the combination of the upper or shoe proper having the screw-threaded bolt-holes, the sole or auxiliary shoe having the bolt-holes registering with said screw-threaded holes and extending as a continuously-formed member from the toe to both heels of said shoe proper and interlocking with said toe and said heels, spike-holes each having an enlarged upper or inner end, removable spikes in said spike-holes and having each a head retained in said enlarged end, and retaining-bolts in said bolt-holes, substantially as shown and described.

In testimony whereof I affix my signature in presence of two witnesses.

CHARLES H. GREENWELL.

Witnesses:
 WM. C. THOMPSON,
 E. T. SILVIUS.